US005987708A

United States Patent [19]

Newton

[11] Patent Number: 5,987,708

[45] Date of Patent: Nov. 23, 1999

[54] GARBAGE BAG RESTRAINT FOR SECURING TRASH LINERS TO CONTAINERS

[76] Inventor: Randy Joe Newton, 3800 Longhorn La., Oakley, Calif. 94561

[21] Appl. No.: 09/045,969

[22] Filed: Mar. 21, 1998

[51] Int. Cl.[6] .......... F16B 2/20; A45F 5/00; B65D 77/10

[52] U.S. Cl. .......... 24/30.5 S; 24/30.5 R; 24/30.5 P

[58] Field of Search .......... 24/30.5 S, 30.5 P, 24/30.5 R, 547

[56] References Cited

U.S. PATENT DOCUMENTS

| | | | |
|---|---|---|---|
| 2,396,906 | 3/1946 | Windson | 24/30.5 S X |
| 2,981,990 | 5/1961 | Balderree, Jr. | 24/30.5 S X |
| 3,962,757 | 6/1976 | Gedney | 24/30.5 S X |
| 4,760,624 | 8/1988 | Fish | 24/30.5 S |
| 4,896,366 | 1/1990 | Oxman | 24/30.5 S X |
| 5,257,845 | 11/1993 | McConnell | 294/171 |
| 5,311,646 | 5/1994 | Eischen, Sr. | 24/30.5 S |
| 5,695,088 | 12/1997 | Kasbohm | 24/30.5 S X |

*Primary Examiner*—James R. Brittain
*Assistant Examiner*—Robert J. Sandy
*Attorney, Agent, or Firm*—Bielen, Peterson & Lampe

[57] ABSTRACT

A pocket sized plastic restraint, having a rigid edge (1*a*) and flexible center (1*b*). In the flexible center (1*b*) is a flexible gripping strip opening (2*d*) that gathered excess liner material is inserted through and held tight by. The gripping strip opening (2*d*) is a serrated opening that bites into the gathered liner like teeth, to hold the bag tight without cutting it. At the base of the garbage bag restraint (2*c*) is a tucking strip opening (2*e*) for tucking excess bag material. The garbage bag restraint (2*c*) holds bags tight around the rim of containers that are smaller than the bag.

6 Claims, 2 Drawing Sheets

GARBAGE BAG RESTRAINT (2c)

ACTUAL SIZE
3.5" BY 2.5"

GARBAGE BAG RESTRAINT (2c)

ACTUAL SIZE
3.5" BY 2.5"

USE OF GARBAGE BAG RESTRAINT

GARBAGE BAG RESTRAINT FOR SECURING TRASH LINERS TO CONTAINERS

BACKGROUND AND SUMMARY OF THE INVENTION

This invention is a device that holds garbage and trash liners tight to the rim of the containers in which they are used, when the bag is oversized for the container.

The advantage of the garbage bag restraint in holding garbage and trash liners tight to the rim of the containers is the specific purpose for the invention. Presently, if a bag is too big for the container, it is usually hand tied to keep it in place. The garbage bag restraint eliminates hand tying, by firmly gripping the excess material and holding it tight to the rim of the container, and tucks it in at the base of the restraint in a neat manner. It is easily attached, removable, reusable, attractive, and saves time.

DETAILED DESCRIPTION OF THE PREFERRED EMBODIMENT

Figure 1:
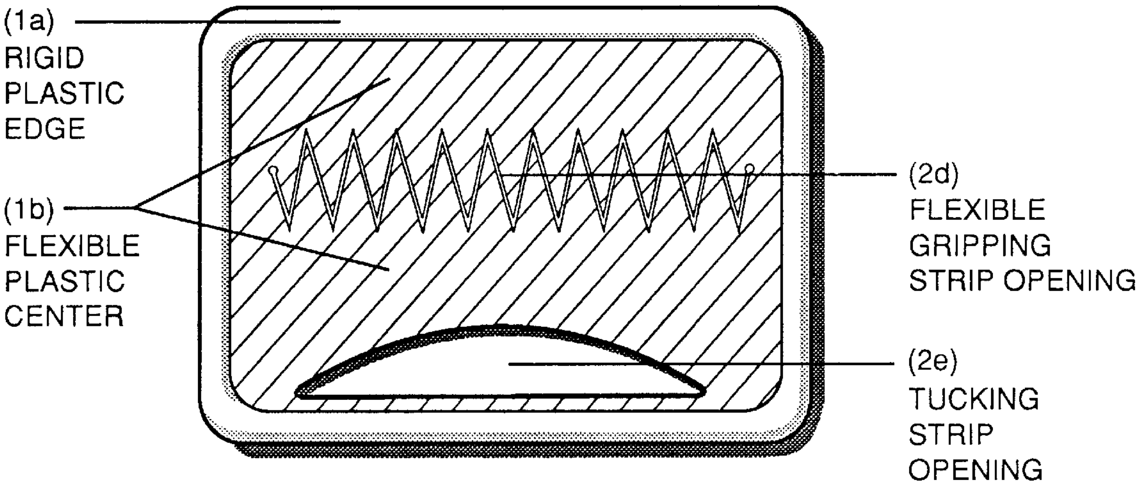
FIG. 1 is a front perspective view of the garbage bag restraint.

In the drawings (FIG. 1) illustrates the actual size and construction of the garbage bag restraint. The pocket sized restraint includes a continuous and unbroken rigid plastic outer edge (1*a*) to retain its shape, and a flexible plastic center (1*b*) with a serrated gripping strip opening (2*d*) that gathered excess is forced through and cinched. The base of the restraint has an opening or tucking strip in the form of an elongated, crescent-shaped hole (2*e*) to slip the excess through, giving it a neat appearance.

Figure 2:
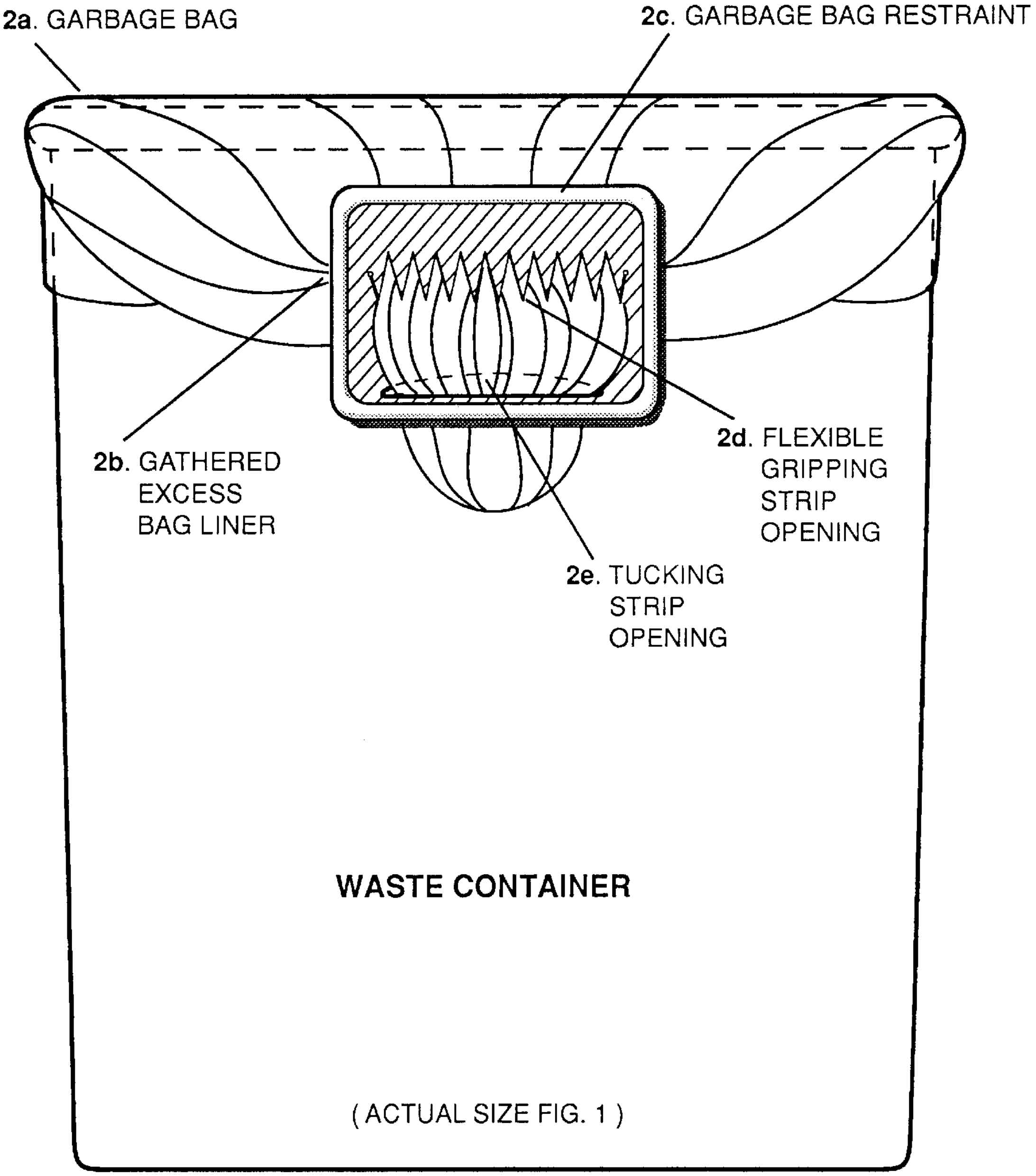
FIG. 2 is a front perspective view of the garbage bag restraint in use on a garbage bag and waste container.

In drawing FIG. 2 the use of the garbage bag restraint is shown.

(2*a*) depicts the actual trash bag or liner.

(2*b*) illustrates gathering of the excess bag or liner before attaching the restraint.

(2*c*) is the actual garbage bag restraint,in use.

(2*d*) shows excess bag or liner that has been forced through the serrated gripping strip opening.

(2*e*) shows how excess material is inserted through the tucking strip of the restraint.

The garbage bag restraint as depicted in FIG. 1, is constructed from various materials, such as polyethelene, polypropylene, or vinyl. The rigid plastic edge (1*a*) is of sufficient thickness to retain its shape with repeated use. The flexible plastic center (1*b*) made of the same material, is of sufficient thickness to allow it to easily flex open and shut at the flexible gripping strip opening (2*d*) for inserting and removing excess material repeatedly without breaking. The garbage bag restraint is easily formed of 1 piece construction. The gripping strip opening (2*d*) and the tucking strip opening (2*e*) are mechanically stamped in after formation of the pocket-reatrained plastic restraint.

The actual size of the garbage bag restraint (2*c*) is shown in FIG. 1 being 3.5" in width by 2.5: in heighth.

The garbage bag restraint is an attractive reusable device made for attaching garbage and trash liners to any container that is smaller than the bag.

I claim:

1. A plastic garbage bag restraint for holding a garbage bag tightly to a rim of a waste container that is smaller than the garbage bag, the plastic garbage bag restraint being pocket-sized and having a continuous and unbroken rigid outer edge and a flexible center, the flexible center having a flexible gripping strip opening in the form of a slit and a tucking strip opening in the form of a hole, wherein a garbage bag installed in a waste container smaller than the garbage bag having excess material of the garbage bag at the rim insertable through the flexible gripping strip opening for holding the bag tightly to the rim of the waste container and then insertable through the tucking strip opening for a neat appearance, the restraint thereby eliminating hand tying of excess garbage material around the rim of waste containers.

2. The plastic garbage bag restraint of claim 1 wherein the slit of the gripping strip is jagged.

3. The plastic garbage bag restraint of claim 1 wherein the gripping strip is serrated.

4. The plastic garbage bag restraint of claim 1 wherein the hole of the tucking strip opening is elongated.

5. The plastic garbage bag restraint of claim 4 wherein the elongated hole is crescent-shaped.

6. The plastic garbage bag restraint of claim 2 wherein the hole of the tucking strip is elongated.

* * * * *